(12) United States Patent
Chuang

(10) Patent No.: US 7,530,555 B2
(45) Date of Patent: May 12, 2009

(54) DAMPING ASSEMBLY FOR A CONSTRUCTION

(76) Inventor: Kuo-Jung Chuang, No. 25-1, Lane 62, Sec. 2, Chinan Rd., Taipei (TW)

( * ) Notice: Subject to any disclaimer, the term of this patent is extended or adjusted under 35 U.S.C. 154(b) by 214 days.

(21) Appl. No.: 11/633,610

(22) Filed: Dec. 4, 2006

(65) Prior Publication Data

US 2007/0241488 A1    Oct. 18, 2007

(30) Foreign Application Priority Data

Apr. 18, 2006   (TW) .............................. 95206525 U

(51) Int. Cl.
*F16M 1/00* (2006.01)
*E04B 1/98* (2006.01)

(52) U.S. Cl. ..................... 267/136; 52/167.1; 52/167.4; 248/638

(58) Field of Classification Search ................. 267/136; 52/167.1, 167.2, 167.4, 167.7, 167.8; 248/562, 248/638; 188/371, 372, 378
See application file for complete search history.

(56) References Cited

U.S. PATENT DOCUMENTS

| 5,442,883 | A | * | 8/1995 | Nishimura et al. ......... 52/167.2 |
| 5,713,163 | A | * | 2/1998 | Mutaguchi et al. ......... 52/167.1 |
| 6,135,411 | A | * | 10/2000 | Shirasawa ................ 248/349.1 |
| 6,986,412 | B2 | * | 1/2006 | Shimazaki et al. .......... 188/267 |
| 2004/0098930 | A1 | * | 5/2004 | Hamidi et al. ............. 52/167.4 |

* cited by examiner

*Primary Examiner*—Melody M Burch
(74) *Attorney, Agent, or Firm*—Charles E. Baxley

(57) ABSTRACT

A damping assembly includes a supporting base, a stainless steel layer having an arcuate slippery top face mating to the arcuate top face of the supporting base, a polytetrafluoroethylene layer movably seated on top of the arcuate slippery top face of the stainless steel layer, a supporting stainless steel layer placed on top of the polytetrafluoroethylene layer to force the polytetrafluoroethylene layer, a rubber pad provided on top of the supporting stainless steel layer providing necessary resilience, a confinement to confine the rubber pad when experiencing a load on the rubber pad and a top supporting plate for firm attachment to a bottom face of a main construction such that movement of the polytetrafluoroethylene layer offsets a shaking force and the rubber pad provides balance to the top supporting plate and absorbs vertical vibration force to protect the main construction from damage of an earthquake.

4 Claims, 8 Drawing Sheets

DAMPING ASSEMBLY FOR A CONSTRUCTION

BACKGROUND OF THE INVENTION

1. Field of the Invention

The present invention relates to a damping assembly, and more particularly to a damping assembly for a construction such that the construction is protected from damage resulting from earthquake.

2. Description of the Prior Art

One of the conventional damping assembly is shown in FIG. 6, which includes a bottom disk (80), a top disk (81), a lead core (82) centrally installed between the bottom disk (80) and the top disk (81), a rubber layer (84) mounted around the lead core (82) and defining therein multiple receiving spaces and multiple stainless steel plates (83) each received in a corresponding one of the receiving spaces of the rubber layer (84). Normally, the bottom disk (80) is firmly mounted on a foundation of a construction and the top disk (81) is firmly attached to a bottom face of the construction.

When there is an earthquake, the stainless steel plates (83) provides the rigidity and the rubber layer (84) provides the resilience to the construction. As a result, the construction may be exempted from damage of the earthquake. However, this type of damping assembly is bulky and expensive. The mounting procedure is complex and troublesome.

A different damping assembly is shown in FIG. 7. This type of damping assembly includes a base (90) having a concavity defined therein, a rubber (91) received inside the concavity of the base (90), a supporting layer mounted on top of the rubber layer (91) and having a skirt extending outward from a top face of the supporting layer, a Teflon® layer (93) mounted on top of the supporting layer (92), a stainless steel layer (94) placed on top of the Teflon® layer (93) and a top pad (95) on top of the stainless steel layer (94). A cushion pad (96) is provided between a top face of the base (90) and the bottom face of the skirt of the supporting layer (92). Normally, the base (90) is mounted on the foundation of the construction and the top pad (95) is firmly attached to the construction. When earthquake occurs, the stainless steel layer (94) provides the rigidity and the rubber layer (91) provides the resilience to the construction. As a result, the construction may be exempted from damage of the earthquake.

Though economic, due to the overall thickness of this type of damping assembly being thin, when the construction or the foundation is tilted as a result of the earthquake, the top pad (95) is easily moved and tilted, which damages the construction.

Still another conventional damping assembly in the art is shown in FIG. 8 and has a bottom support (97) with an arcuate top face, a top support (98) on top of the bottom support (97) and having an arcuate bottom face and a sliding block (99) sandwiched between the bottom support (97) and the top support (98). The sliding block (99) is able to move between the arcuate top face and the arcuate bottom face. In practice, the bottom support (97) is securely attached to a top face of a construction or a foundation of a construction and the top support (98) is firmly attached to a bottom face of a main construction such that when an earthquake occurs, the relative movement of the top support (98) and the bottom support (97) offsets the damping from the earthquake and the construction is protected.

However, this type of damping assembly has high cost and not reliable in relation to the sliding block (99). It is because after the sliding block (99) has been used for a period of time, the friction coefficient between the top face and the bottom face of the sliding block (99) remains the same, but due to different wear degrees to the top face and the bottom face, the viscosity of the sliding block (99) to the arcuate top face and the arcuate bottom face of the sliding block (99) varies from each other.

To overcome the shortcomings, the present invention tends to provide an improved damping assembly to mitigate the aforementioned problems.

SUMMARY OF THE INVENTION

The primary objective of the present invention is to provide an improved damping assembly having a supporting base, a stainless steel layer, a supporting polytetrafluoroethylene ("PTFE") layer, a supporting stainless steel layer, a rubber pad, a confinement and a top supporting plate. The stainless steel plate has a top face processed to become slippery such that the stainless steel plate has a slippery top face which is arcuate so as to allow the PTFE layer to slide thereon.

Another objective of the present invention is that the damping assembly has a sealing plate provided to two opposite sides of the assembly to function as a dustproof element.

Other objects, advantages and novel features of the invention will become more apparent from the following detailed description when taken in conjunction with the accompanying drawings.

DETAILED DESCRIPTION OF THE PREFERRED EMBODIMENT

Figure 1:
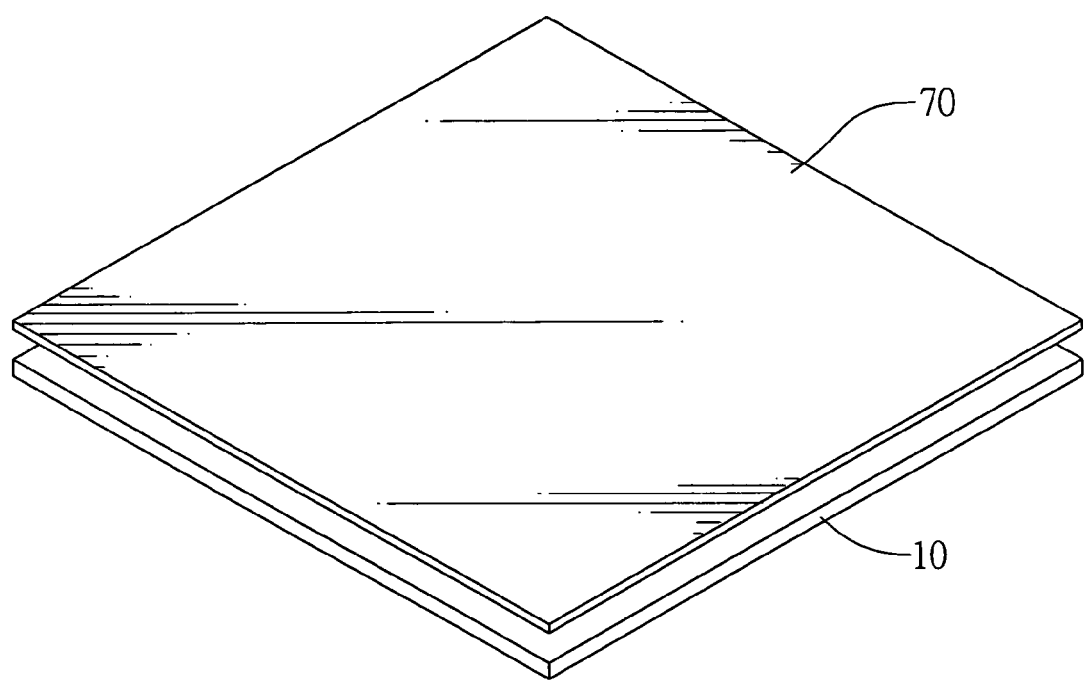
FIG. 1 is a perspective view of the damping assembly of the present invention.
Figure 2:
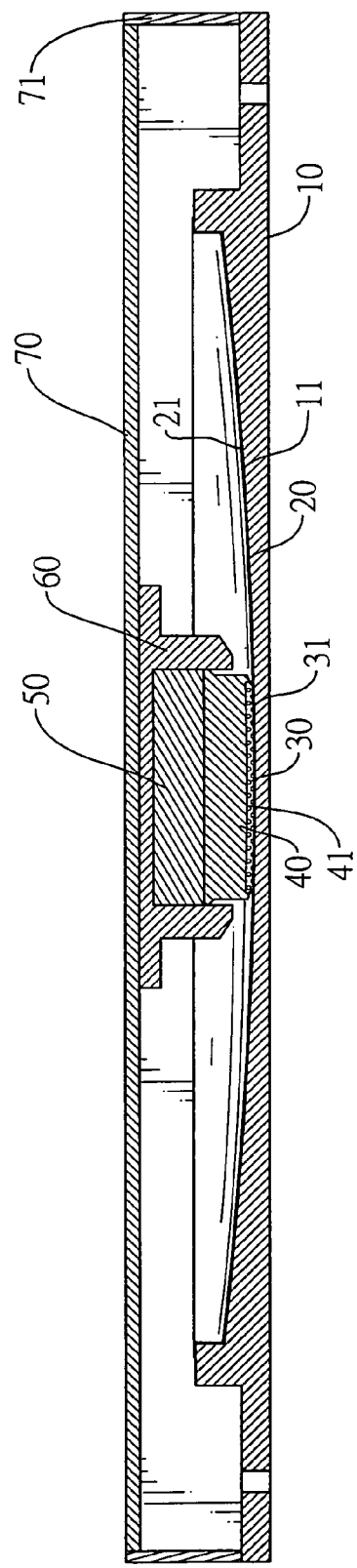
FIG. 2 is a cross sectional view of the damping assembly of the present invention.

With reference to FIGS. 1 and 2, it is noted that the damping assembly constructed in accordance with the present invention includes a supporting base (10), a stainless steel layer (20), a supporting PTFE layer (30), a supporting stainless steel layer (40), a rubber pad (50), a confinement (60) and a top supporting plate (70).

The supporting base (10) is securely and firmly attached to a foundation of a construction or a top face of a construction element. The supporting base (10) has an arcuate top face (11) with the stainless steel layer (20) seated thereon. The top face of the stainless steel layer (20) is processed to become slippery such that the stainless steel layer (20) has a slippery top face (21). Because the stainless steel layer (20) is seated on top of the arcuate top face (11) of the supporting base (10) and is so thin that the slippery top face (21) is also configured as an arcuate slippery top face (21).

The PTFE layer (30) has a bottom face 31 is provided on the arcuate slippery top face (21) of the stainless steel layer (20) to provide a low coefficient medium. The supporting stainless steel layer (40) is provided on top of the PTFE layer (30) and has a convex bottom face (41) corresponding to the arcuate slippery top face (21) such that after the supporting stainless steel layer (40) is placed on top of the PTFE layer (30), the supporting stainless steel layer (40) forces the PTFE layer (30) to deform to perfectly engage with the arcuate slippery top face (21) of the stainless steel layer (20).

The rubber pad (50) is placed on top of the supporting stainless steel layer (40) to provide resilience when a great load is applied thereon. The confinement (60) has a substantially circular configuration and defines a concavity in a bottom face of the confinement (60) to receive therein the rubber pad (50). The top supporting plate (70) is provided on top of the confinement (60).

From the above description, it is noted that there is no provision of particular fastening element to combine any two adjacent components of the present invention. However, any know method in the field would be easily adopted to accomplish the combination of two adjacent components.

Figure 3:
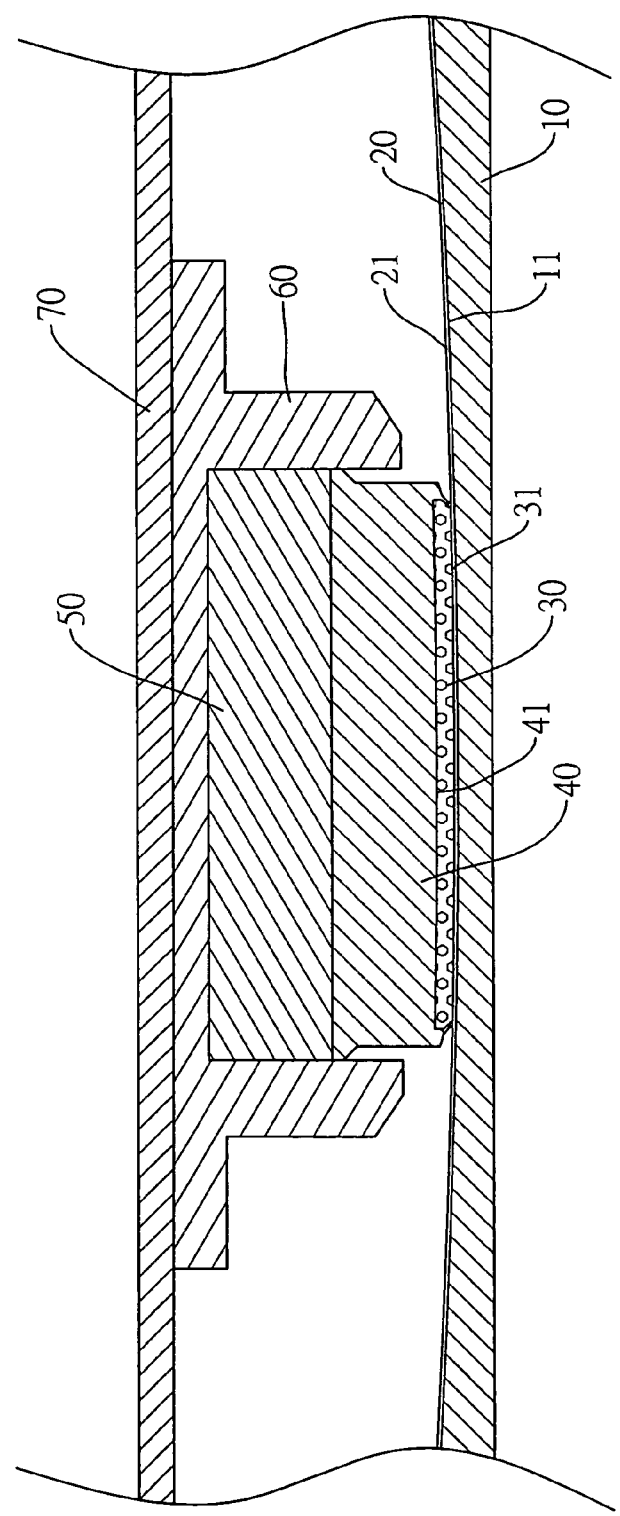
FIG. 3 is an enlarged cross sectional view showing the relationship among elements of the present invention.

With reference to FIG. 3 and still using FIG. 2 for reference, after the combination of the components of the present invention, it is to be noted that the stainless steel layer (20) is on top of the supporting base (10). The PTFE layer (30) is movably mounted on top of the stainless steel layer (20). The supporting stainless steel layer (40) is on top of the PTFE layer (30). The rubber pad (50) and the confinement (60) are sequentially placed on top of the supporting stainless steel layer (40). Lastly, the top supporting plate (70) is on top of the confinement (60).

Figure 4:
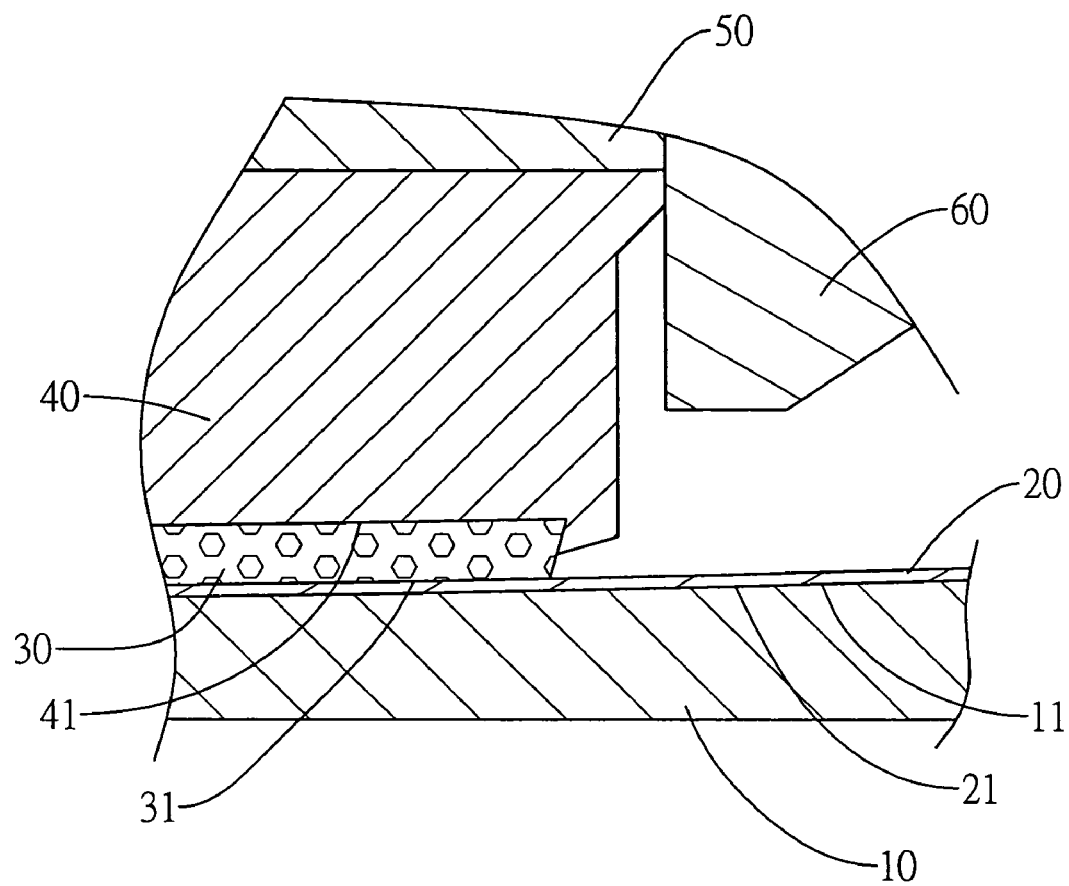
FIG. 4 is an enlarged cross sectional view showing the PTFE layer is securely received inside the supporting stainless steel layer.

From the depiction of FIG. 4, it is noted that the supporting stainless steel layer (40) has a recessed area with a peripheral edge of the recessed area formed into a wedge so that the PTFE layer (30) is able to be securely received inside the recessed area of the supporting stainless steel layer (40).

Figure 5:
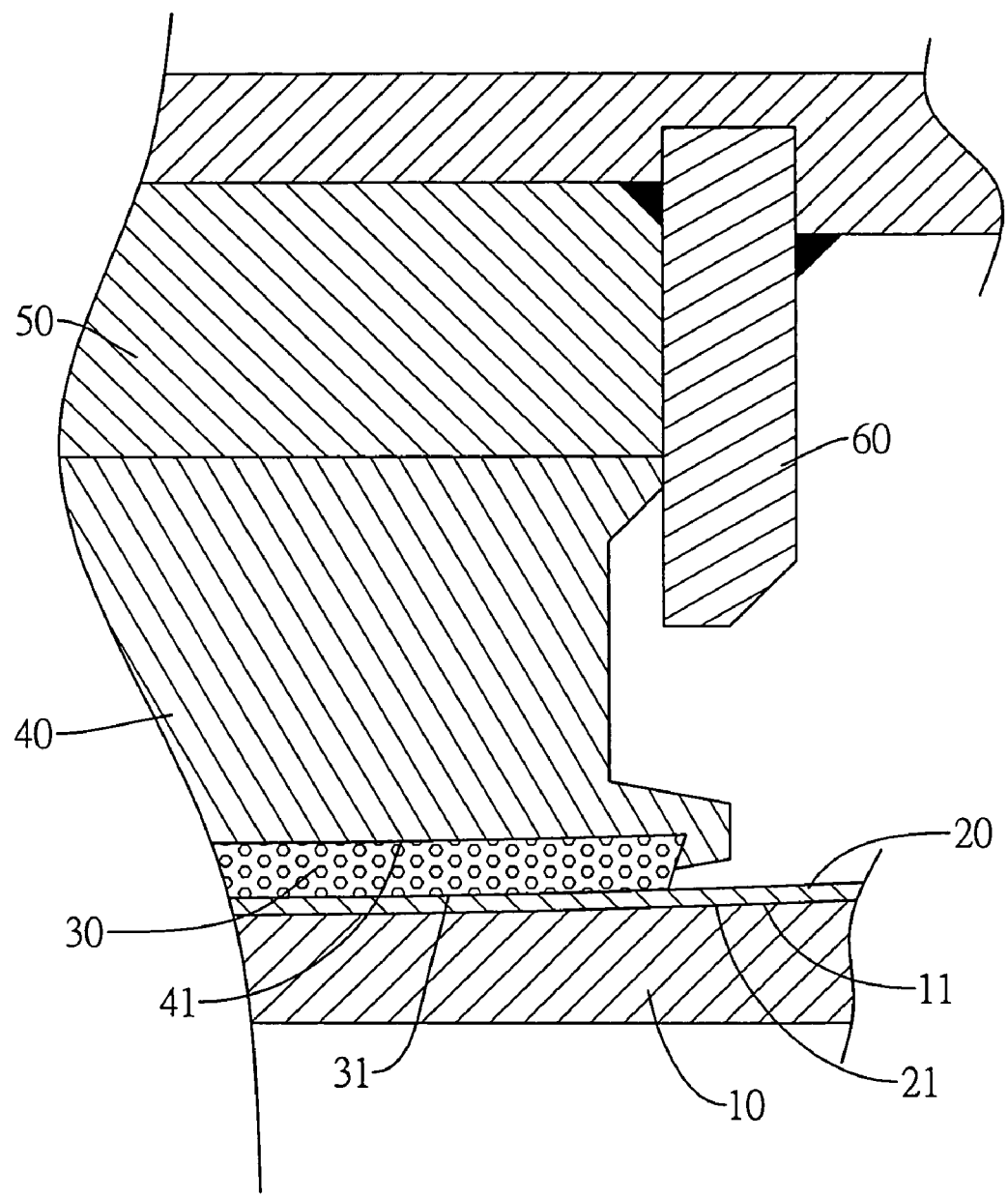
FIG. 5 is an enlarged cross sectional view showing a different dimension of the PTFE layer and how the supporting stainless steel layer is connected to the PTFE layer.
Figure 6:
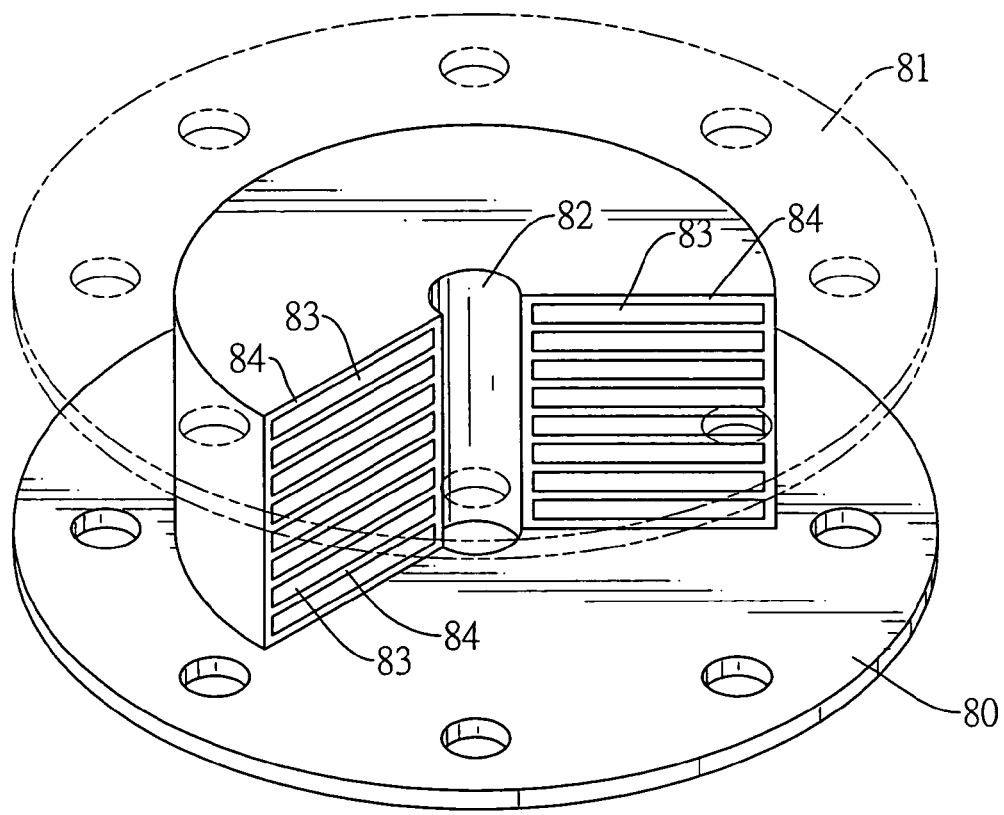
FIG. 6 is a perspective view of a first conventional damping assembly with the top disk in dashed lines.
Figure 7:
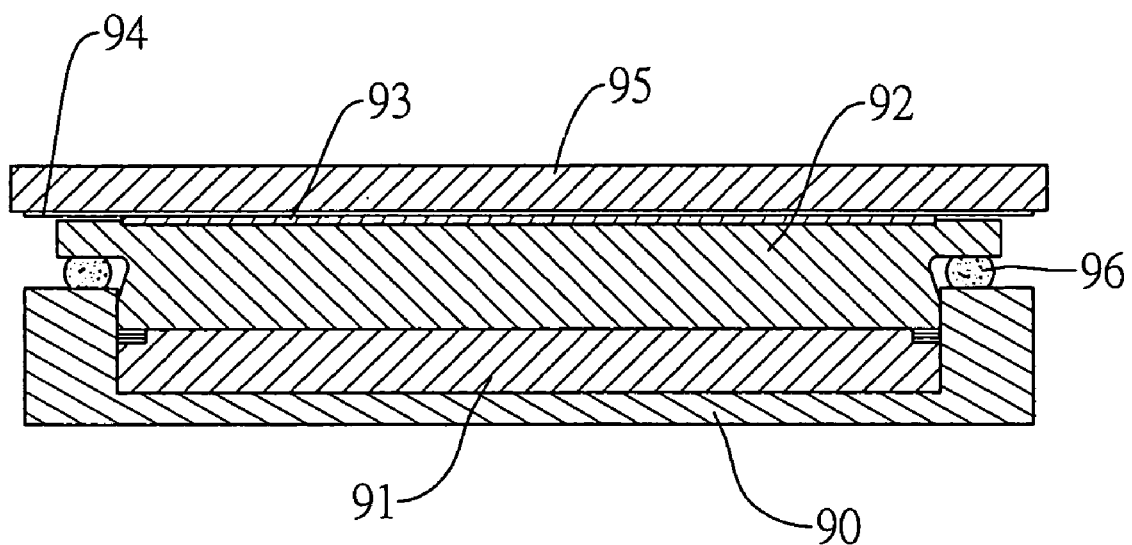
FIG. 7 is a cross sectional view of a second conventional damping assembly.
Figure 8:
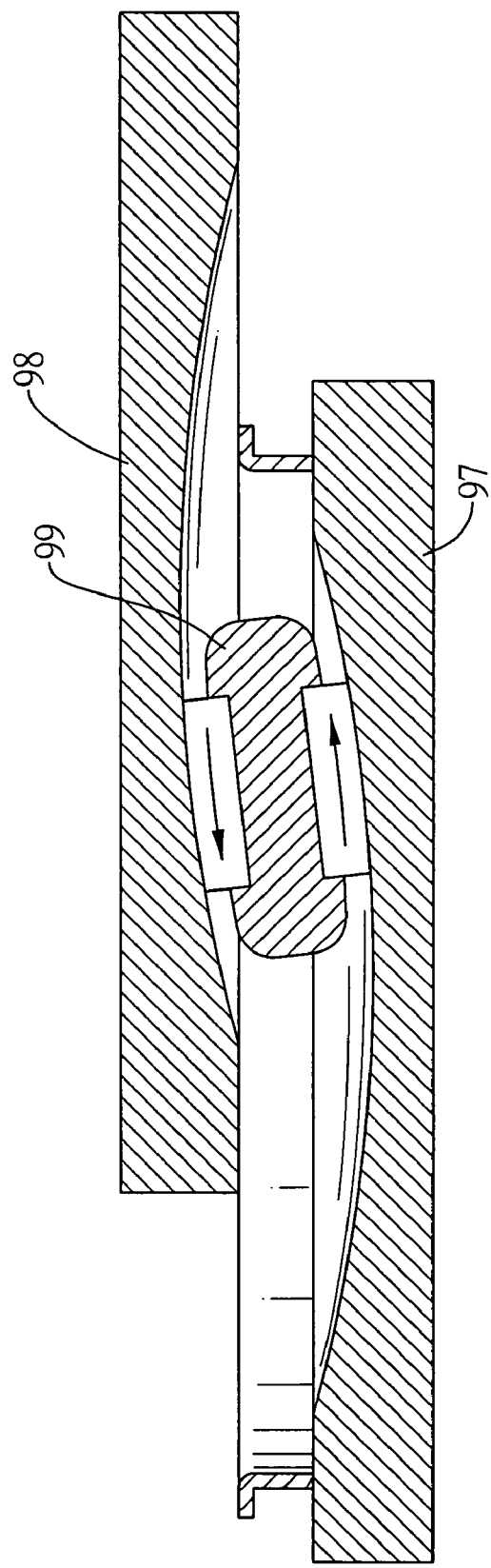
FIG. 8 is a schematically cross sectional view of a third conventional damping assembly.

FIG. 5 shows that the PTFE layer (30) has a dimension larger that of the PTFE layer (30) shown in FIG. 4. But still the function of the PTFE layer (30) is the same.

After the assembly of the present invention, it is noted that when there is an earthquake and a bottom face of a main construction is firmly attached to a top face of the top supporting plate (70), vibration or shaking caused by the earthquake will move the main construction, which leads to the result that the main construction as well as the top supporting plate (70), the confinement (60), the rubber pad (50), the supporting stainless steel (40) and the PTFE layer (30) is moved relative to the arcuate slippery top face (21) of the non-supporting stainless steel layer (20).

Due to the arcuate configuration of the arcuate slippery top face (21) of the non-supporting stainless steel layer (20) and the arcuate top face (11) of the supporting base (10), the main construction will eventually return to its original position where the main construction is initially designed to be located.

The rubber pad (50) provides necessary resilience when there is a large load or an uneven force acted upon the top supporting plate (70) so as to maintain the top supporting plate (70) balance. Also, when the foundation of the main construction is tilted or the construction element which is attached to the bottom of the supporting base (10) is tilted, the rubber pad (50) is able to maintain the balance of the top supporting plate (70), which protects the main construction from damage of the earthquake.

In addition to the advantages of the present invention, the damping assembly of the present invention is provided with a dustproof plate (71) which is provided to close a gap between the top supporting plate (70) and the supporting base (10) so as to prevent dust or any kind of pollutant from entering the damping assembly of the present invention.

From the above description, it is appreciated that the damping assembly of the present invention has the following advantages:

Large Load Bearing Capability

The damping assembly of the present invention has large load bearing capability and the overall structure experiences no deformation due to the provision of the confinement (60) which is preferably made of metal.

Dustproof

Because of the dustproof plate (70), the internal structure is free from Influence of pollutants.

Good Damping Effect

Because of the arcuate slippery top face (21) of the stainless steel layer (20) and the PTFE layer (30) movably mounted on top of the arcuate slippery top face (21), the vibration and/or shaking force to the main construction on top of the PTFE layer (30) is easily damped away. That is, when the shock wave of the earthquake is a vertical type vibration (up and down pattern), the rubber pad (50) absorbs the vibration and no harm will do to the main construction. When the shock waver of the earthquake is a radial type vibration (right to left shaking), movement of the PTFE layer (30) on top of the arcuate slippery top face (21) of the stainless steel layer (20) offsets the shaking force and the main construction is preserved from destruction.

Low cost for few elements employed and great balance.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A damping assembly consisting essentially of:
    a supporting base having an arcuate top face;
    a first stainless steel layer placed on top of the supporting base and having an arcuate slippery top face mating to the arcuate top face of the supporting base;
    a polytetrafluoroethylene layer movably seated on top of the arcuate slippery top face of the first stainless steel layer;
    a supporting stainless steel layer placed on top of the polytetrafluoroethylene layer to force the polytetrafluoroethylene layer to completely engage with the arcuate slippery top face of the first stainless steel layer;
    a rubber pad provided on top of the supporting stainless steel layer providing necessary resilience;
    a confinement mounted on top of the rubber pad to enclose the rubber pad so as to confine the rubber pad when experiencing a load on the rubber pad; and
    a top supporting plate placed on top of the confinement for firm attachment to a bottom face of a main construction such that movement of the polytetrafluoroethylene layer offsets a shaking force and the resilience of the rubber pad provides balance to the top supporting plate and absorbs vertical vibration force to protect the main construction from damage of an earthquake.

2. The damping assembly as claimed in claim 1, wherein the supporting stainless steel layer has a convex bottom face corresponding to the arcuate slippery top face of the first stainless steel layer so that the polytetrafluoroethylene layer is forced to completely engage with the arcuate slippery top face of the first stainless steel layer.

3. The damping assembly as claimed in claim 1 further having a dustproof plate enclosing a gap between the top supporting plate and the supporting base to prevent pollutants from entering the damping assembly.

4. The damping assembly as claimed in claim 2 further having a dustproof plate enclosing a gap between the top supporting plate and the supporting base to prevent pollutants from entering the damping assembly.

* * * * *